F. D. CLEVELAND.
APPARATUS FOR TREATING FISH.
APPLICATION FILED JULY 19, 1916.

1,236,405.

Patented Aug. 14, 1917.
2 SHEETS—SHEET 1.

Inventor
Francis D. Cleveland
By his attorney, Charles S. Gooding

UNITED STATES PATENT OFFICE.

FRANCIS D. CLEVELAND, OF CAMBRIDGE, MASSACHUSETTS, ASSIGNOR TO WILLIAM UNDERWOOD COMPANY, OF BOSTON, MASSACHUSETTS, A CORPORATION OF MASSACHUSETTS.

APPARATUS FOR TREATING FISH.

1,236,405.    Specification of Letters Patent.    Patented Aug. 14, 1917.

Application filed July 19, 1916. Serial No. 110,225.

*To all whom it may concern:*

Be it known that I, FRANCIS D. CLEVELAND, a citizen of the United States, residing at Cambridge, in the county of Middlesex and State of Massachusetts, have invented new and useful Improvements in Apparatus for Treating Fish, of which the following is a specification.

This invention relates to an apparatus which automatically cuts off the heads and tails of fish and cooks them preparatory to the canning operation. In one embodiment of the invention the apparatus first automatically cuts off the heads and tails of the fish, then separates the fish from a mass of the same and distributes them on a conveyer belt which constitutes a "flake." The fish are then conducted downwardly through a drying chamber wherein they are dried and the dried fish are then automatically conveyed through a tank containing hot oil whereby said fish are fried. Heretofore in frying fish it has been the custom in this art to cut the heads and tails off of the fish either by hand or by machine, then by hand to take the fish and place them on the "flakes" which are frames with a netting thereon and these flakes are then placed on suitable carriages and the carriages pushed into a drying chamber where, after the fish have remained a sufficient time, they become dried and the carriages are then removed from the drying chamber, the flakes removed from the carriages and the fish dumped into baskets. Said baskets are then placed in a tank containing hot oil until the fish in the baskets are fried, whereupon the baskets are removed and the fish are then ready to be canned.

Another method of cooking fish has been to cut the heads and tails off either by hand or by machine and then place the same on "flakes." The flakes are then placed on suitable carriages and the carriages are pushed into a steaming chamber. After remaining in the steaming chamber a suitable length of time they are then pushed into a very hot chamber where they are baked. The carriages are then removed from the baking chamber and the flakes removed from the carriages and the fish are then ready to be canned.

These different methods of cutting, flaking, drying and frying fish and cutting, flaking, steaming and baking are each of them very expensive and slow on account of the number of different steps that have to be taken and the number of times which the fish have to be handled and it is, therefore, the object of this invention to provide an apparatus which will automatically cut the heads and tails off the fish, then transfer them to a flaking member from which they pass to a drying chamber where the fish will be automatically passed through the chamber and dried and finally to pass the fish automatically from the drying chamber into suitable receptacles, which receptacles will be carried through a tank containing hot oil and the fish will thus be fried, the receptacles finally being carried automatically out of the frying tank to a suitable table from which they will be transferred to the cans.

The apparatus further is adapted to handle the fish by first cutting them, then passing them to the flake and distributing them thereover and from the flake automatically carrying the fish into a steaming chamber where they are steamed and subsequently automatically passed through a baking chamber where they are baked and finally carrying the fish automatically out of the baking chamber and into receptacles provided therefor from which they are taken to be canned.

The invention primarily consists in an apparatus for cutting, "flaking" and drying the fish; second, the invention consists in an apparatus for cutting, drying and frying the fish; third, the invention consists in an apparatus for cutting, "flaking," drying and frying the fish.

The invention further consists in the combination and arrangement of parts set forth in the following specification and particularly pointed out in the claims thereof.

Referring to the drawings.

Like numerals refer to like parts throughout the several views of the drawings.

I will first describe the apparatus as it is used for cutting, "flaking," drying and frying fish.

Figure 1:
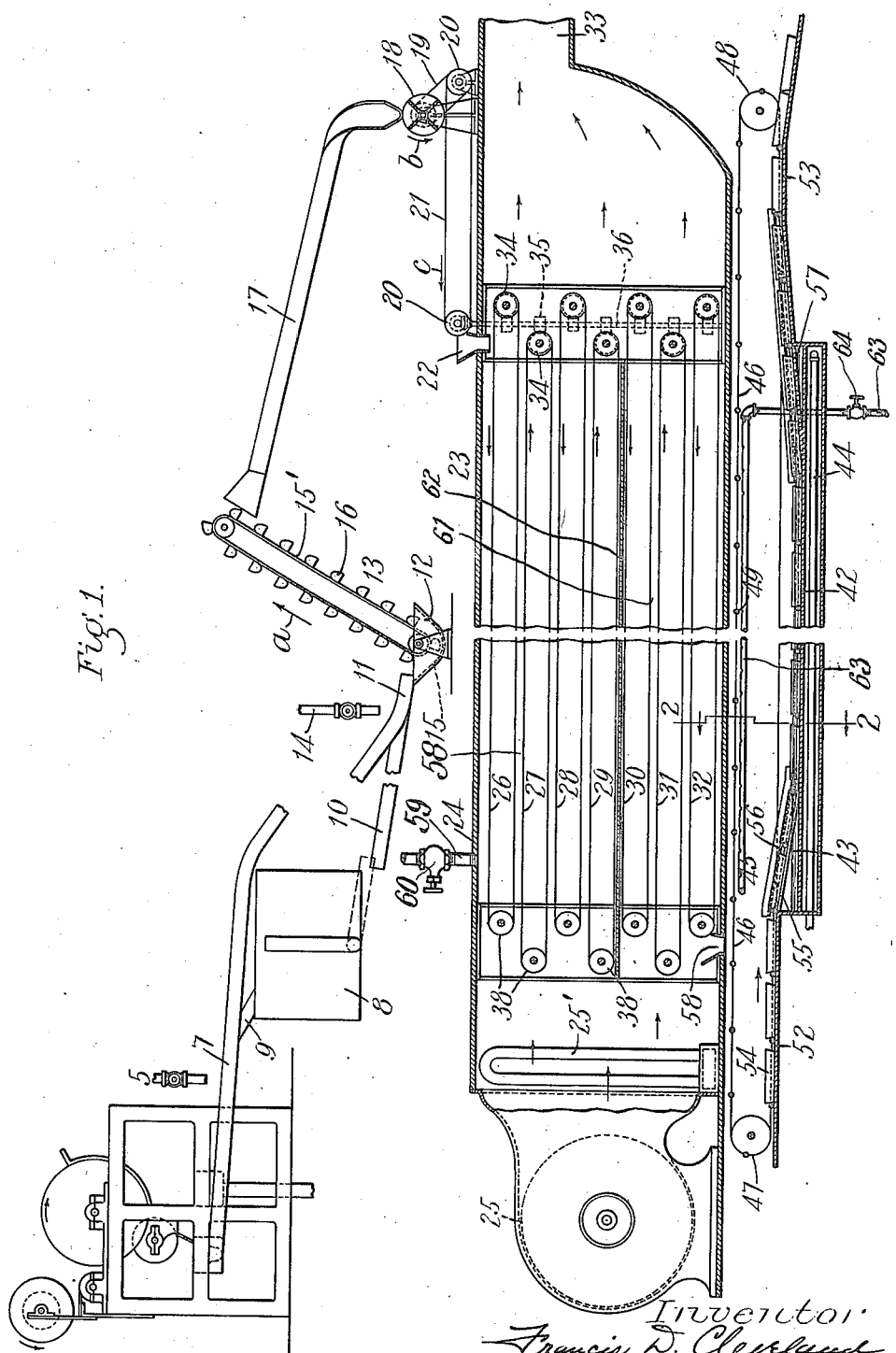
Figure 1 is a side elevation, partly in section, of my improved apparatus for cutting, drying and cooking fish, the same being shown somewhat diagrammatically and broken away to save space in the drawings.

In the drawings, 5 is a machine for cutting off the heads and tails of fish, the drawings somewhat diagrammatically representing a machine similar to the machine for which U. S. Letters Patent No. 1,129,168 were issued to me. The bodies of the fish after having the heads and tails removed therefrom pass down a chute into a conductor 7 and along said conductor and above brine tanks 8. If it is desired to salt the fish they are delivered by the conductor 7 into the brine tanks through suitable openings which are closed by means of the drop doors 9. After the fish have been salted sufficiently in the brine tanks they are delivered therefrom into a conductor 10. If, however, it is not desired to submit the fish to the brine they are carried by the conductor 7 downwardly to the conductor 11, both the conductors 7 and 10 merging and emptying into the conductor 11 (Fig. 1). The fish in mass pass down the conductor 11 into a receptacle known as a "boot" 12 for the elevator 13. The fish are floated down the inclined chute 11 in a stream of water supplied by suitable pipes 14 and this water enters the boot 12, together with the fish, and thoroughly washes said fish. The water passes out, together with the scales and dirt, through perforations 15 in the bottom of said boot.

The elevator 13 consists of an endless belt or chain 15' with buckets 16 attached thereto which scoop the fish up out of the boot 12. It will be understood that the buckets 16 thus subdivide the mass of fish which enters the boot 12 into fractional parts thereof. These fractional parts of the original mass of fish which is delivered to the boot by the conductor 11 are carried by the buckets 16 upwardly in the direction of the arrow *a* and are dumped at regular intervals and in substantially equal amounts into the chute 17 which guides the fish into a rotary separator 18.

The separator 18 is rotated by means of a belt 19 and pulley 20 in the direction of the arrow *b*. The fish are dumped from the separator 18 and are spread out over the surface of an endless conveyer belt 21 which is operated to move on its upper side in the direction of the arrow *c* and constitutes a "flake." The fish are carried by said flake, or conveyer 21 to the inlet opening 22 of a drying chamber 23.

The drying chamber 23 consists of a casing 24 and is provided at one end with a fan 25 which drives the air through a heating coil 25' and between a series of horizontally disposed endless belts 26, 27, 28, 29, 30, 31 and 32. The air passing between said belts passes out through the air shaft outlet 33.

It will be noted that the belts 27, 29 and 31 project at one end thereof beyond the ends of the belts 26, 28 and 30 and 32 adjacent thereto, while at the opposite ends of said belts the belts 26, 28, 30 and 32 project beyond the belts 27, 29 and 31. The belts 26, 28, 30 and 32 are moved in the opposite direction to that of the belts 27, 29 and 31. Said belts are driven by sprocket gears 34 which, in turn, are driven by worm gears 35 on a vertical shaft 36. The belts 26 to 32 inclusive are all driven by the sprockets 34 and by chains 37 which extend over sprockets 38. These chains (see Fig. 2) are fastened to pipes 39 to which the belts 26 to 32 inclusive are fastened. The pipes 39 are provided at their opposite ends with rollers 40 which run on guide rails 41 consisting of angle irons which are fastened to the casing 24.

Beneath the drying chamber 23 is located a frying tank 42 containing oil 43, said oil being heated by suitable heating means 44. A conveyer 45 is interposed between the bottom of the casing 24 and the frying tank 42. This conveyer consists of chains 46 driven by sprockets 47 and 48. The chains 46 are connected together by pipes 49 which are provided with rolls 50 arranged to run upon guide rails 51.

The opposite ends of the frying tank are extended to form tables 52 and 53 and receptacles consisting, preferably, of wire mesh baskets 54 are placed upon the table 52 and carried along by the chains 46 and pipes 49 to an inclined guide 55. The baskets are pushed down this inclined guide which is preferably formed of a series of fingers into the oil 43 in the tank 42. Rollers 50 run beneath guide rails 56 and thus the receptacles 54 are carried along the table 52 down the inclined fingers 55 into the oil at the bottom of the tank 42. At the opposite end of the tank said receptacles 54 are carried up out of the tank on an incline 57 to the table 53. The receptacles are then manually removed.

It will be noted that the baskets 54 as they pass through the frying tank 42 scrape along the bottom of said tank and thus all scales, dirt and waste of any kind which tend to collect upon the bottom of said tank are carried by the baskets scraping along the bottom of said tank, out of said tank along the incline 57 and onto the table 53 from which it can be removed by the operator of the apparatus, so that the baskets 54, in addition to carrying the fish through the oil in the tank and frying said fish, continually operate to keep the bottom of said tank clean and to remove from said tank any dirt and waste material.

The general operation of the mechanism hereinbefore described for cutting, "flaking," drying and frying fish is as follows: The fish have their heads and tails cut off in a fish cutting machine 5, they then pass along the chutes 7 and 11 to the elevator 13 and from the elevator 13 along the chute 17 through the separator 18 whence they are carried by the conveyer belt flake 21 and dumped through the inlet opening 22 into the drying chamber 23 over the upper belt 26. Said belt carries the fish toward the left (Fig. 1) and dumps them onto a belt 27. The belt 27 carries the fish toward the right and dumps them onto the belt 28 and so on, and thus the fish are carried backward and forward through the casing 24 until they are finally dumped by the belt 32 through the outlet opening 58 into the baskets 54. The baskets 54 are pushed by the pipes 49 along the table 52 down the incline 55 into the boiling oil 43 in the frying tank 42 and are pushed along through said tank and fried. Said receptacles 54 are then carried up the incline 57 onto the table 53 where they are removed by the attendant of the machine, to be subsequently placed in cans.

Figure 2:
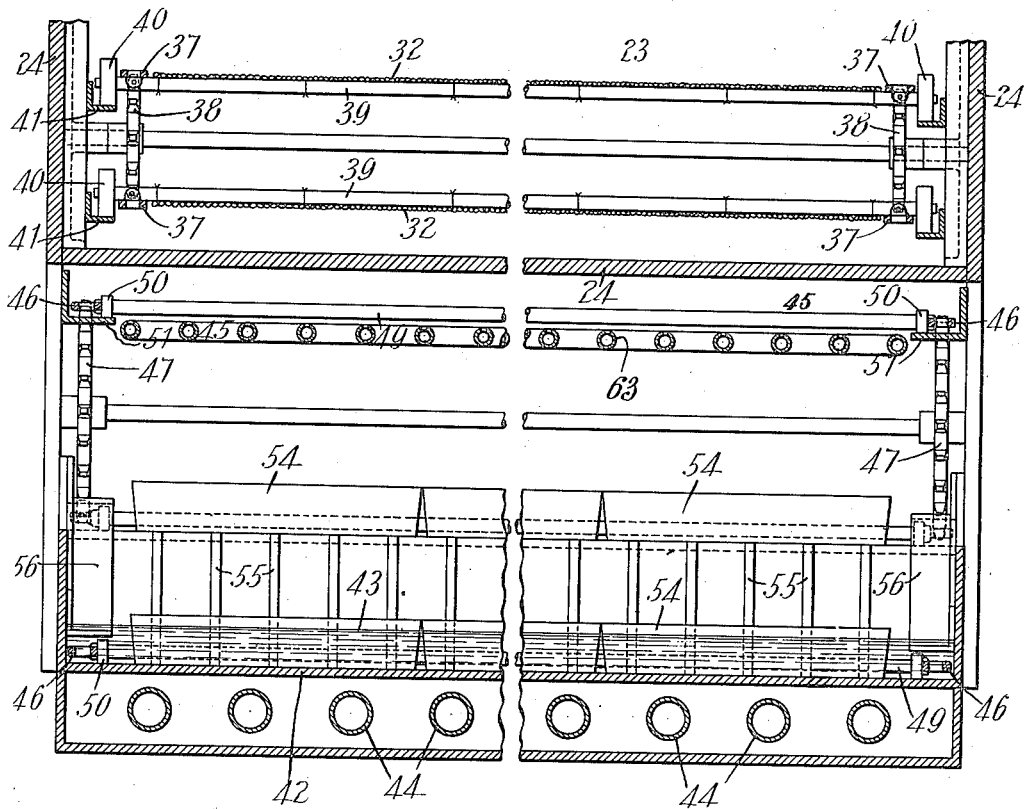
Fig. 2 is an enlarged detail sectional elevation taken on line 2—2 of Fig. 1.

When the apparatus is used to bake the fish instead of frying the same the same apparatus is employed as hereinbefore described and as illustrated in Figs. 1 and 2 except that steam is conveyed into the upper portion 58 of the chamber 23 by a pipe 59 which is provided with a valve 60 so that steam may be admitted to the upper half 58 of the chamber 23 or not as desired. The lower half 61 of the chamber 23 is separated from the upper half of said chamber by a partition 62 and this lower half is heated very hot to bake the fish after they have been steamed, by any suitable heating means, as, for example, by gas jets proceeding from a gas pipe 63 which is provided with a valve 64, whereby gas may be admitted to that portion of the pipe 63 beneath the chamber 23 or shut off therefrom as desired.

The general operation of the apparatus when employed for cutting, "flaking," steaming and baking the fish is as follows: The operation of the apparatus up to the point where the "flaking" conveyer belt 21 empties the fish into the drying chamber is the same as hereinbefore described in relation to the apparatus when it is employed for cutting, "flaking," drying and frying the fish. The fish after having been flaked are passed from the conveyer belt 21 onto the belt 26 and are carried by the belts 26, 27, 28 and 29 through the steaming chamber 58, it being understood that at this time the valve 60 is open to admit steam, into said steaming chamber. The fish after having been steamed pass from the steaming chamber 58 into the baking chamber 61 and are carried by the belts 30, 31 and 32 through said baking chamber, finally being guided through the outlet 58 into the receptacles 54 which feed them along and through the tank 42 and onto the table 53, it being understood that when the fish are being baked, as hereinbefore described, the frying tank contains no oil. After the fish arrive on the table 53 they are taken out of the baskets 54 and are placed in the cans.

Having thus described my invention, what I claim and desire by Letters Patent to secure is:

1. An apparatus for cutting, drying and frying fish having, in combination, a machine constructed and arranged to cut fish, a drying chamber having an inlet and an outlet opening, a tank constructed and arranged to contain oil, means for heating the oil in said tank, means for conveying fish from said fish cutting machine into said drying chamber through said inlet opening and means for conveying said fish through said chamber to said outlet opening and a conveyer constructed and arranged to carry said fish from said outlet opening into and through said tank, whereby said fish may be automatically cut, dried and fried.

2. An apparatus for cutting, "flaking" and drying fish having, in combination, a machine constructed and arranged to cut fish, a "flake," a drying chamber having an inlet opening and an outlet opening, means for conveying fish from said fish cutting machine to said "flake," means for moving said "flake," whereby said fish are delivered to the inlet opening of said drying chamber and means for conveying said fish through said chamber to said outlet opening, whereby said fish may be automatically cut, "flaked" and dried.

3. An apparatus for cutting, "flaking," drying and frying fish having, in combination, a machine constructed and arranged to cut fish, a drying chamber having an inlet and an outlet opening, a "flake" interposed between said cutting machine and said drying chamber, a tank constructed and arranged to contain oil, means for heating the oil in said tank, means for conveying fish from said fish cutting machine to said "flake," means for moving said "flake" to deliver the fish therefrom into said drying chamber through said inlet opening, means for conveying said fish through said chamber to said outlet opening and a conveyer constructed and arranged to feed said fish into and through said tank, whereby said fish may be automatically cut, "flaked," dried and fried.

In testimony whereof I have hereunto set my hand in presence of tw osubscribing witnesses.

FRANCIS D. CLEVELAND.

Witnesses:
SYDNEY E. TAFT,
ANNIE J. DAILEY.